US011460595B2

(12) United States Patent
Al-Ali et al.

(10) Patent No.: US 11,460,595 B2
(45) Date of Patent: Oct. 4, 2022

(54) UNIFIED CONTINUOUS SEISMIC RESERVOIR MONITORING

(71) Applicant: Saudi Arabian Oil Company, Dhahran (SA)

(72) Inventors: Mustafa Naser Al-Ali, Al Seef (BH); Hongwei Liu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 221 days.

(21) Appl. No.: 16/388,597

(22) Filed: Apr. 18, 2019

(65) Prior Publication Data

US 2020/0333489 A1 Oct. 22, 2020

(51) Int. Cl.
*G01V 1/30* (2006.01)
*G01V 1/28* (2006.01)

(52) U.S. Cl.
CPC .............. *G01V 1/308* (2013.01); *G01V 1/282* (2013.01); *G01V 2210/671* (2013.01); *G01V 2210/675* (2013.01); *G01V 2210/679* (2013.01)

(58) Field of Classification Search
CPC .... G01V 1/83; G01V 1/308; G01V 2210/612; G01V 2210/6122; G01V 2210/671; G01V 2210/675; G01V 2210/679
See application file for complete search history.

(56) References Cited

U.S. PATENT DOCUMENTS

| 3,731,270 | A | 5/1973 | Penhollow |
| 7,966,882 | B2 | 6/2011 | Greenwood et al. |
| 9,477,000 | B2 | 10/2016 | Yang |
| 10,107,927 | B2 | 10/2018 | Alkhatib |
| 10,914,853 | B2 | 2/2021 | Al-Ali et al. |
| 2001/0021940 | A1 | 9/2001 | Fuji |
| 2005/0088913 | A1* | 4/2005 | Lecomte ................ G01V 1/282 367/51 |
| 2008/0019215 | A1* | 1/2008 | Robertsson .......... G01V 1/3843 367/19 |
| 2008/0195358 | A1 | 8/2008 | El Ouair et al. |

(Continued)

FOREIGN PATENT DOCUMENTS

| GB | 2433780 | 7/2007 |
| WO | 2019055565 | 3/2019 |

OTHER PUBLICATIONS

Gulf Cooperation Council Examination Report issued in GCC Application No. GC 2018-34966 dated Oct. 6, 2019, 4 pages.

(Continued)

*Primary Examiner* — Michael J Dalbo
(74) *Attorney, Agent, or Firm* — Fish & Richardson P.C.

(57) ABSTRACT

A method of generating a four dimensional seismic signal based on multiple sets of seismic data representing a subterranean formation. The method can include generating a tomographic velocity model based on a first set of raw seismic data and determining at least one Green's function based on the tomographic velocity model. The method can include generating a first image of a target region based on the first set of raw seismic data and the at least one Green's function. The method can include generating a second image of the target region based on a second set of raw seismic data and the at least one Green's function. The first and the second images can be compared, and a four-dimensional seismic signal can be determined based on the comparison.

20 Claims, 6 Drawing Sheets

(56) References Cited

U.S. PATENT DOCUMENTS

| | | | |
|---|---|---|---|
| 2008/0294387 | A1 | 11/2008 | Anderson et al. |
| 2010/0177595 | A1 | 7/2010 | Khare et al. |
| 2010/0185422 | A1 | 7/2010 | Hoversten |
| 2011/0144965 | A1 | 6/2011 | Rossi et al. |
| 2011/0153285 | A1 | 6/2011 | Da Veiga et al. |
| 2011/0199860 | A1 | 8/2011 | Houck et al. |
| 2011/0246161 | A1 | 10/2011 | Morton et al. |
| 2011/0292764 | A1 | 12/2011 | Kelly et al. |
| 2012/0014217 | A1* | 1/2012 | Houck .................. G01V 1/308 367/72 |
| 2012/0113750 | A1 | 5/2012 | Al-Momin et al. |
| 2013/0179082 | A1* | 7/2013 | Geerits .................. G01V 1/42 702/11 |
| 2013/0245952 | A1 | 9/2013 | Lin et al. |
| 2013/0301387 | A1 | 11/2013 | Van Groenestijn |
| 2014/0019108 | A1 | 1/2014 | Da Veiga et al. |
| 2014/0172307 | A1 | 6/2014 | Svay et al. |
| 2014/0200815 | A1 | 7/2014 | Muroyama et al. |
| 2015/0006083 | A1* | 1/2015 | McAuliffe ............. G01V 1/308 702/11 |
| 2016/0091624 | A1* | 3/2016 | Haacke ................. G01V 1/308 702/16 |
| 2016/0281497 | A1 | 9/2016 | Tilke et al. |
| 2016/0282490 | A1* | 9/2016 | Qin ....................... G01V 1/282 |
| 2016/0356905 | A1* | 12/2016 | Alkhatib ............... G01V 1/308 |
| 2017/0177992 | A1 | 6/2017 | Klie |
| 2017/0315266 | A1 | 11/2017 | Myers et al. |
| 2018/0106137 | A1 | 4/2018 | Frosell et al. |
| 2018/0120461 | A1 | 5/2018 | Allegar et al. |
| 2018/0267187 | A1 | 9/2018 | Al-Ali et al. |
| 2019/0129049 | A1 | 5/2019 | Magill et al. |
| 2019/0196039 | A1 | 6/2019 | Wilson et al. |
| 2019/0353814 | A1* | 11/2019 | Cha ....................... G01V 1/362 |

OTHER PUBLICATIONS

GCC Examination Report in GCC Appln. No. GC 2018-34966, dated Aug. 31, 2020, 3 pages.

Al-Ali et al., "An integrated method for resolving the seismic complex near-surface problem," Geophysical Prospecting, Nov. 2006, 54:739-750.

Huang et al., "Direct correlation of 4D seismic with well activity for a clarified dynamic reservoir interpretation," Geophysical Prospecting, Aug. 2011, 60(2): 293-312.

Liu et al., "A Target-oriented imaging approach for continuous seismic reservoir monitoring," presented at the 79th EAGE Conference & Exhibition, Paris, France, Jun. 12-15, 2017, 5 pages.

Xu et al., "3D angle gathers from reverse time migration," Geophysics, Society of Exploration Geophysicists, Mar. 2011, 76(3): 77-92.

Yin et al., "Enhancement of dynamic reservoir interpretation by correlating multiple 4D seismic monitors to well behavior," Interpretation, May 2015, 3(2): SP35-SP52.

PCT International Search Report and Written Opinion in International Appln. No. PCT/US2020/028428, dated Jul. 24, 2020, 16 pages.

PCT International Search Report and Written Opinion in International Appln. No. PCT/US2020/025679, dated Jul. 14, 2020, 15 pages.

International Search Report and Written Opinion issued in International Application No. PCT/US2018/022164 dated Jun. 27, 2018, 14 pages.

Al-Ali, "Land seismic data and acquisition and preprocessing: an operator solution to the near-surface problem," retrieved from the Internet via URL: <https://repository.tudelft.nl/islandora/object/uuid:baa60972-94c0-4c74-8642-6015db8e61a0?collection=research#>, retrieved on Jun. 11, 2018, published Jun. 18, 2007, 34 pages.

Berkhout, "Pushing the limits of seismic imaging, Part I: Prestack migration in terms of double dynamic focusing," Geophysics vol. 62, No. 3, May 1, 1997, 17 pages.

Carvalho dos Santos et al., "Semi-Quantitative 4D Seismic Interpretation Integrated with Reservoir Simulation: Application to the Norne Field," Interpretation, vol. 6, Issue 3, Aug. 2018, 11 pages.

Chadwick et al., "4D Seismic quatification of a prowing CO2 plune at Sleipner, North Sea," in Dore and Vining, Petroleum Geology: North-West European and Global Perspectives—Proceeding of the 6th Petroleum Geology Conference, 2005, 15 pages.

Gousselin et al., "History of Matching Using Time-Lapse Seismic (HUTS)," SPE-84464-MS, presented at the SPE Annual Technical Conference and Exhibition, Oct. 5-8, 2003, 2 pages, Abstract Only.

Hodgson et al., "Generating value from 4D through efficient integration," The Leading Edge, Vo. 36, No. 5, May 2017, 6 pages.

Huang et al., "The First Post-Injection Seismic Monitor Survey at the Ketzin Pilot CO2 Storage Site: Results from Time-Lapse Analysis," Geophysical Prospecting, vol. 66, Issue 1, Jan. 2018, 23 pages.

Liu and Al-Ali, "Common-focus point-based target-oriented imaging approach for continuous seismic reservoir monitoring," Geophysics vol. 83, Issue 4, Jul.-Aug. 2018, 8 pages.

Nivlet et al., "A New Methodology to Account for Uncertainties in 4D Seismic Interpretation," Processions of the SEG Annual Meeting, San Antonio, Sep. 9-14, 2001, 4 pages.

Skjervheim et al., "Incorporating 4D Seismic Data in Reservoir Simulation Models Using Ensemble Kalman Filter," SPE 95789, presented at the 2005 SPE Annual Technical Conference and Exhibition on Oct. 9-12, 2005, 11 pages.

Winthaegen et al., "CFP-approach to time-lapse angle-dependent reflectivity analysis," SEG International Exposition and Annual Meeting, Sep. 9, 2001, 4 pages.

CN Office Action issued in Chinese Appln. No. 201880028403.3, dated Apr. 16, 2021, 14 pages (With English Translation).

GCC Examination Report issued in Gulf Cooperation Council Appln. No. 2020-39564, dated Aug. 17, 2021, 5 pages.

* cited by examiner

UNIFIED CONTINUOUS SEISMIC RESERVOIR MONITORING

TECHNICAL FIELD

The present disclosure generally relates to methods of conducting seismic surveys.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications such as, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources such as, for example, borehole logging, gravity surveys, and magnetic surveys.

One approach to this analysis is based on tracing and correlating along continuous reflectors throughout the dataset produced by the seismic survey to produce structural maps (images) that reflect the spatial variation in depth of certain facies. These maps can be used to identify impermeable layers and faults that can trap hydrocarbons, such as oil and gas. In some instances, tracing can involve the process of migration (imaging), which involves the repositioning of seismic data so that a more accurate picture of subsurface reflectors is given. Performing migration calculations can include determining/approximating the seismic velocities in the subsurface at a multitude of points.

Furthermore, four-dimensional seismic interpretation methods typically involve comparing the differences in maps/images or other seismic processing products generated from seismic data acquired at different times. For example, an initial seismic survey of a target region (for example, a reservoir), often referred to as a baseline survey, can be recorded prior to any hydrocarbon production or injection within the target region. Then, a subsequent monitor survey may be recorded after a period of years has passed during which hydrocarbons were produced in the target region. The subsurface seismic reflectivity can change between these two seismic surveys. These differences are typically interpreted to be caused by changes in fluid content and pressure in the hydrocarbon reservoir. These differences can be used to estimate which parts of the reservoir have been producing hydrocarbons and which parts of the reservoir might produce hydrocarbon more efficiently by a change in well pattern or fluid injection methods.

SUMMARY

This specification describes systems and methods in which a unified approach for continuous reservoir monitoring is used to detect a four-dimensional seismic signal indicating possible changes in subsurface seismic reflectivity between successive seismic surveys. As used in this specification, a four-dimensional seismic signal refers to the magnitude of a change in acoustic response of a reservoir between two seismic surveys taken over the same region at different times. A baseline seismic survey designed to image the reservoir under consideration is used to calculate a subsurface velocity model from the acquisition surface to the reservoir depth. This velocity model is used to calculate Green's functions (scattering curves) at a desired grid spacing from the reservoir level to the surface. These functions are used to calculate an accurate amplitude map at the reservoir along with reflectivity functions necessary for inverting compressional and shear wave velocities and density (elastic parameters) for both the baseline survey and subsequent seismic surveys. The subsequent seismic surveys can be smaller with fewer sources because the data acquired from these surveys are not used to calculate a second velocity model for imaging the subsequent surveys. When compared with traditional approaches to continuous reservoir monitoring, which typically requires the use of full datasets of subsequent seismic surveys (monitoring surveys), this approach reduces both the operational costs of performing subsequent seismic surveys and the computational costs of analyzing the data gathered by the subsequent seismic surveys.

In at least one aspect of the present disclosure, a method of generating a four dimensional seismic signal based on multiple sets of seismic data representing a subterranean formation is provided. The method includes receiving a first set of raw seismic data, the first set of raw seismic data being generated at a first time. The method includes generating a tomographic velocity model based on the first set of raw seismic data. The method includes determining at least one Green's function based on the tomographic velocity model. The method includes generating a first image of a target region based on the first set of raw seismic data and the at least one Green's function. The method includes receiving a second set of raw seismic data, the second set of raw seismic data being generated at a second time. The method includes generating a second image of the target region based on the second set of raw seismic data and the at least one Green's function. The method includes comparing the first image with the second image. The method includes determining a four-dimensional seismic signal based on the comparison.

Generating the tomographic velocity model can include performing full-waveform-inversion. Generating the tomographic velocity model can include performing reverse-time-migration. Determining the at least one Green's function can include using a ray-tracing eikonal approximation method. Determining the at least one Green's function can include using a wave-based approximation method.

Generating the first image and the second image can include generating a first amplitude map and a second amplitude map. The second time can occur after the first time. The first set of data can be received from a first number of sources and the second set of data can be received from a second number of sources being less than the first number of sources.

Determining a four-dimensional seismic signal can include determining the difference between a first plurality of amplitudes of the first image and a second plurality of amplitudes of the second image.

In at least one other aspect of the present disclosure, a system is provided. The system includes a computer-readable medium. The computer-readable medium includes computer-executable instructions. The system includes at least one processor configured to execute the computer-executable instructions. When the at least one processor executes the computer-executable instructions, the at least one processor is caused to perform operations to receive a first set of raw seismic data, the first set of raw seismic data being generated at a first time. When the at least one processor executes the computer-executable instructions, the at least one processor is caused to perform operations to generate a tomographic velocity model based on the first set of raw seismic data. When the at least one processor executes the computer-executable instructions, the at least one processor is caused to perform operations to determine at least one Green's function based on the tomographic velocity model. When the at least one processor executes the computer-executable instructions, the at least one processor is caused to perform operations to generate a first image of a target region based on the first set of raw seismic data and the at least one Green's function. When the at least one processor executes the computer-executable instructions, the at least one processor is caused to perform operations to receive a second set of raw seismic data, the second set of raw seismic data being generated at a second time. When the at least one processor executes the computer-executable instructions, the at least one processor is caused to perform operations to generate a second image of the target region based on the second set of raw seismic data and the at least one Green's function. When the at least one processor executes the computer-executable instructions, the at least one processor is caused to perform operations to compare the first image with the second image. When the at least one processor executes the computer-executable instructions, the at least one processor is caused to perform operations to determine a four-dimensional seismic signal based on the comparison.

Generating the tomographic velocity model can include performing full-waveform-inversion. Generating the tomographic velocity model can include performing reverse-time-migration. Determining the at least one Green's function can include using a ray-tracing eikonal approximation method. Determining the at least one Green's function can include using a wave-based approximation method.

Generating the first image and the second image can include generating a first amplitude map and a second amplitude map. The second time can occur after the first time.

The first set of data can be received from a first number of sources and the second set of data can be received from a second number of sources being less than the first number of sources. Determining a four-dimensional seismic signal can include determining the difference between a first plurality of amplitudes of the first image and a second plurality of amplitudes of the second image.

Embodiments of these systems and methods can include one or more of the following advantages. The present disclosure provides means for continuous reservoir monitoring using a unified approach. The described systems and methods support cost effective continuous reservoir monitoring. By using the described systems and methods, the amount of data collected in monitoring surveys can be selectively reduced compared to baseline surveys. In contrast, conventional methods of continuous reservoir monitoring typically require collecting the same amount of data for the monitoring surveys as the baseline surveys. These conventional approaches are typically expensive with respect to data acquisition and computational cost.

The systems and methods described in this specification use Green's functions determined from a first survey (such as a baseline survey) to generate maps/images of successive seismic surveys (such as a monitoring survey). The systems and methods exploit the fact that changes at the reservoir level due to fluid movement and replacement, for example, by injected water or carbon dioxide, are typically only observed at relatively high reflection angles (for example, the reflection angle of a seismic reflection corresponding to a source and a receiver having an offset larger than 500 meters). Consequently, when compared to conventional methods, the number of surveys that can be conducted within a period of time is increased, fluid acceleration within a target region can be calculated due to the increase in conducted surveys, and the computational cost of processing successive surveys is significantly reduced because the need to process entire data sets from surface to reservoir can be disregarded. Also, the described approach enables cost effective deployment of permanent sources and receivers in a particular region, facilitating cost effective and fully automated reservoir monitoring using seismic data.

The details of one or more embodiments of these systems and methods are set forth in the accompanying drawings and the following description. Other features, objects, and advantages of these systems and methods will be apparent from the description and drawings, and from the claims.

BRIEF DESCRIPTION OF DRAWINGS

Like reference symbols in the various drawings indicate like elements.

DETAILED DESCRIPTION

This specification describes systems and methods in which a unified approach for continuous reservoir monitoring is used to detect a four-dimensional seismic signal indicating possible changes in subsurface seismic reflectivity between successive seismic surveys. A baseline seismic survey designed to image the reservoir under consideration is used to calculate a subsurface velocity model (sometimes referred to as a tomographic velocity model) from the acquisition surface to the reservoir depth. This velocity model is used to calculate Green's functions (scattering curves) at a desired grid spacing from the reservoir level to the surface. These Green's functions are used to calculate an accurate amplitude map at the reservoir along with reflectivity functions necessary for inverting compressional and shear wave velocities and density (elastic parameters) for both the baseline survey and subsequent seismic surveys. The subsequent seismic surveys can be conducted with fewer sources than the baseline survey because the subsequent surveys use the velocity model and the Green's functions generated for the baseline survey. When compared with traditional approaches to continuous reservoir monitoring, which typically requires the use of full datasets of subsequent seismic surveys (monitoring surveys), this approach reduces both the operational costs of performing subsequent seismic surveys and the computational costs of analyzing the data gathered by the subsequent seismic surveys.

Figure 1:
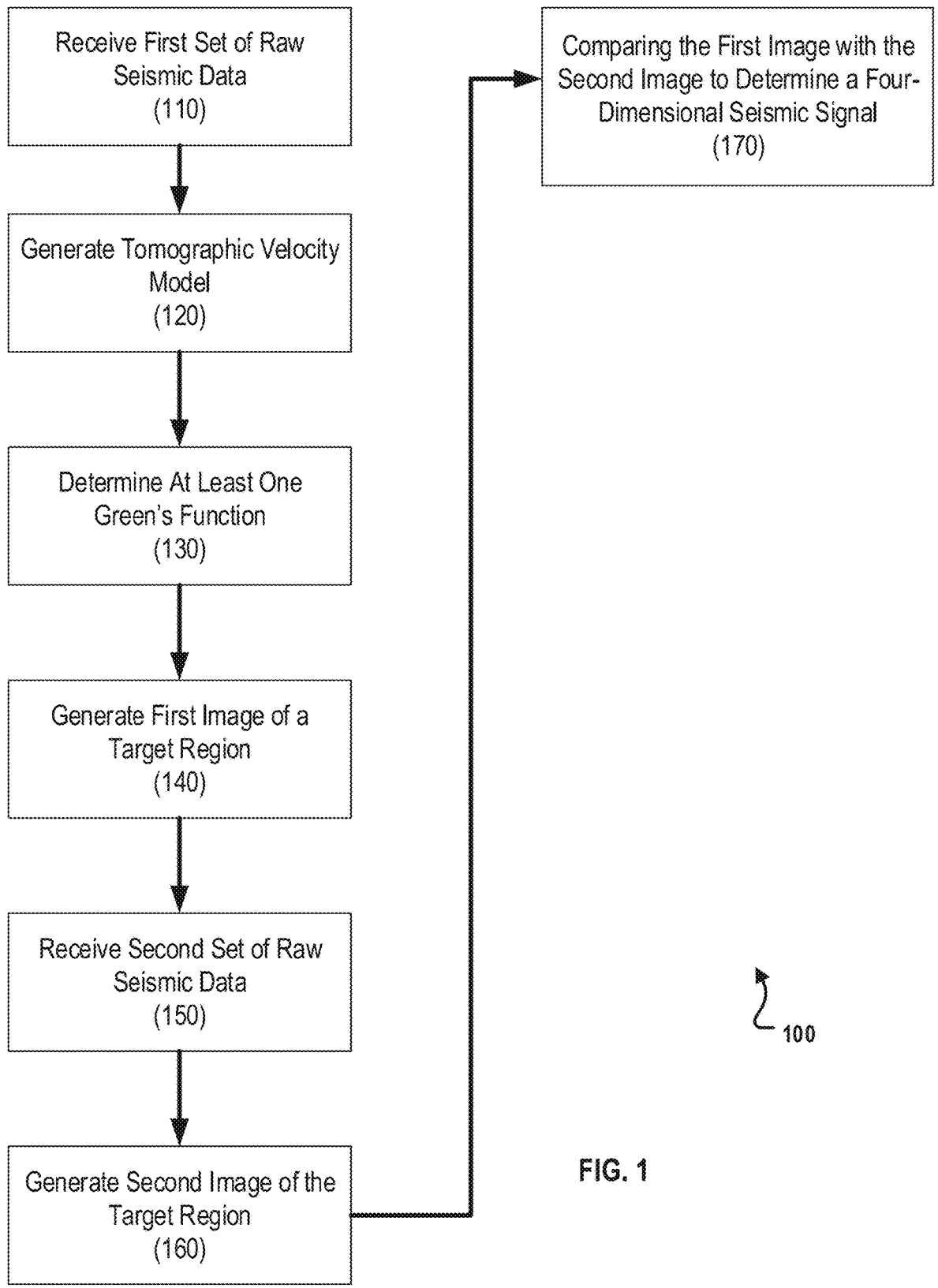
FIG. 1 is a flow diagram illustrating a method of continuous reservoir monitoring.

FIG. 1 is a flow diagram illustrating a method 100 of continuous reservoir monitoring. The method includes receiving a first set of raw seismic data (block 110), generating a tomographic velocity model (block 120), determining at least one Green's function (block 130), generating a first image of a target region (block 140), receiving a second set of raw seismic data (block 150), generating a second image of the target region (block 160), and comparing the first image with the second image to generate a four-dimensional seismic signal (block 170).

Figure 2:
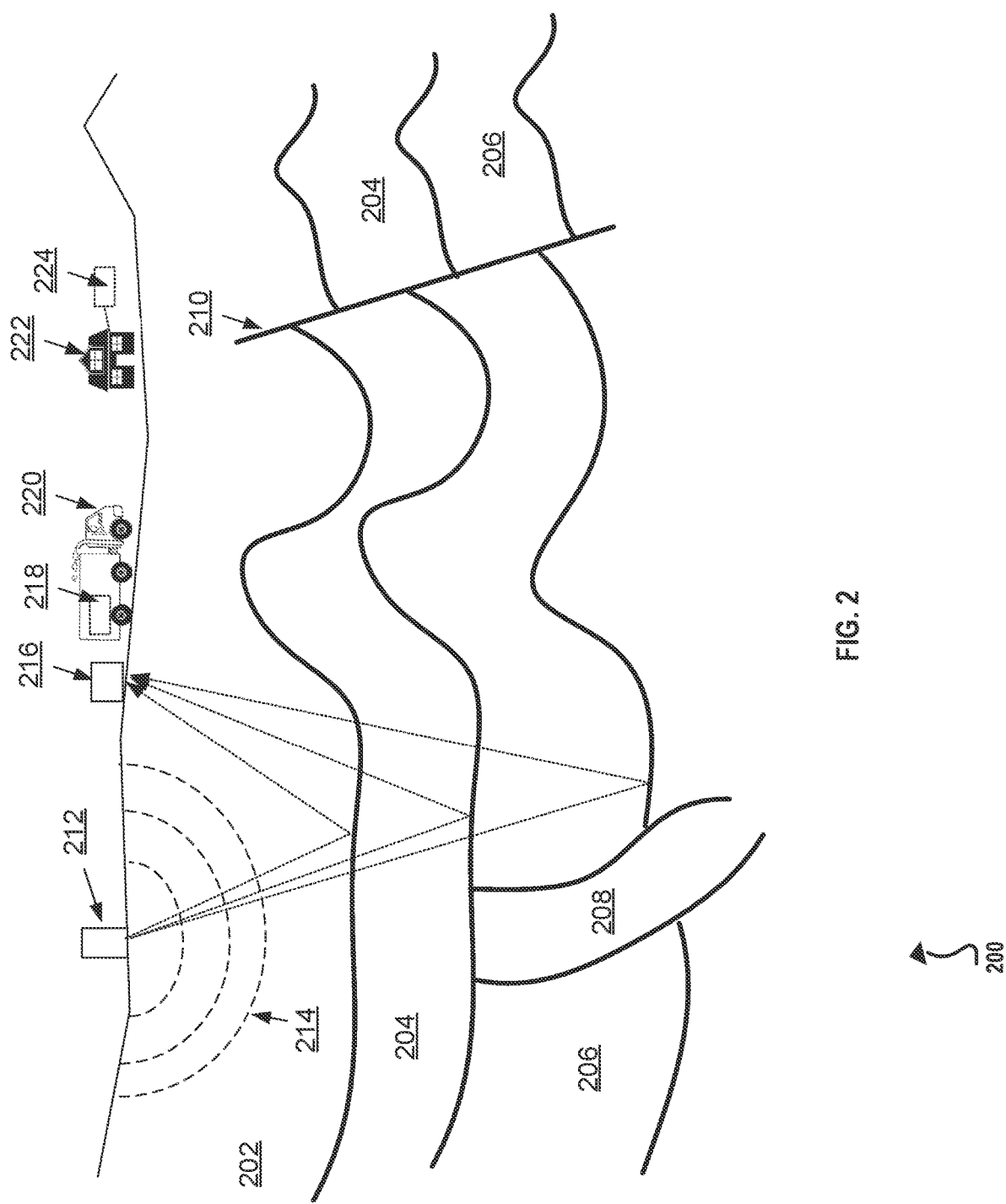
FIG. 2 is a schematic view of a seismic survey being performed to map subterranean features such as facies and faults.

At block 110, program elements are used to store and organize results of a baseline seismic survey to collect a first set of raw seismic data of a target region. For example, FIG. 2 is a schematic view of a seismic survey being performed to map subterranean features of a target region, such as a hydrocarbon reservoir/well. The subterranean formation 200 includes a layer of impermeable cap rocks 202 at the surface. Facies underlying the impermeable cap rocks 202 include a sandstone layer 204, a limestone layer 206, and a sand layer 208. A fault line 210 extends across the sandstone layer 204 and the limestone layer 206.

A seismic source 212 (for example, a seismic vibrator or an explosion) generates seismic waves 214 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 200, the velocity of seismic waves traveling through the subterranean formation 200 will be different in the sandstone layer 204, the limestone layer 206, and the sand layer 208. As the seismic waves 214 contact interfaces between geologic bodies or layers that have different velocities, the interface reflects some of the energy of the seismic wave and refracts some of the energy of the seismic wave. Such interfaces are sometimes referred to as horizons.

The seismic waves 214 are received by a sensor or sensors 216. Although illustrated as a single component, the sensor or sensors 216 are typically a line or an array of sensors 216 that generate an output signal in response to received seismic waves including waves reflected by the horizons in the subterranean formation 200. The sensors 216 can be geophone-receivers that produce electrical output signals transmitted as input data, for example, to a computer 218 on a seismic control truck 220. Based on the input data, the computer 218 may generate a seismic data output such as, for example, a seismic two-way response time plot.

A control center 222 can be operatively coupled to the seismic control truck 220 and other data acquisition and wellsite systems. The control center 222 may have computer facilities for at least one of receiving, storing, processing, or analyzing data from the seismic control truck 220 and other data acquisition and wellsite systems. For example, computer systems 224 in the control center 222 can be configured to analyze, model, control, optimize, or perform management tasks of field operations associated with development and production of resources such as oil and gas from the subterranean formation 200. Alternatively, the computer systems 224 can be located in a different location than the control center 222. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 224 may be displayed for user viewing using local or remote monitors or other display units. One approach to analyzing seismic data is to associate the data with portions of a seismic cube representing the subterranean formation 200. The seismic cube can also display results of the analysis of the seismic data associated with the seismic survey.

Referring back to FIG. 1, additionally or alternatively, the first set of raw seismic data is received from existing seismic data. In some implementations, the first set of raw seismic data is received by one or more computer processors communicatively coupled to a database having seismic data stored thereon.

At block 120 a tomographic velocity model is generated based on the first seismic data set. Generating a tomographic velocity model includes performing velocity analysis on the first seismic data set to estimate one or more migration velocities. Performing velocity analysis includes performing full waveform inversion (FWI). Performing FWI includes inverting the velocity properties through data matching in the time or frequency domain. In some implementations, performing FWI involves the minimization of a square misfit function between calculated and observed data. Performing FWI can include using non-linear gradient based optimizations with complex strategies for regularizing the process (such as filtering, weighting, and muting the data).

Additionally, or alternatively, performing velocity analysis includes performing reverse time migration (RTM). Performing RTM includes determining numerical solutions to a complete wave equation and typically does not have dip limitations. Other seismic depth migration techniques, such as Kirchhoff migration, can be used; however, using RTM can facilitate the handling of complex waveform multipathing, including caustics and prismatic waves. In some implementations, the velocity model resulting from the aforementioned velocity analysis is augmented by well data calibration using well logs and vertical seismic profiling (VSP). A well log refers to a detailed record of the geologic formations penetrated by a borehole and can be based either on visual inspection of samples brought to the surface or on physical measurements made by instruments lowered into the hole. VSP refers to a technique of seismic measurements used for correlation with surface seismic data in which at least one of the energy sources detectors are in a borehole.

At block 130, the tomographic velocity model is used to calculate Green's functions (scattering curves) from the target area (such as the reservoir) to the acquisition surface. In general, a Green's function refers to an integral kernel that can be used to solve differential equations from a relatively large number of families such as ordinary differential equations with initial or boundary value conditions, as well as more complex examples such as inhomogeneous partial differential equations with boundary conditions. The Green's functions represent wave and displacement responses induced by an impulse force. In some implementations, calculating a Green's function involves using a ray-tracing eikonal equation. This includes using the eikonal equation to trace rays indicating the propagation direction at a point on a seismic wave front. In some implementations, a wave based method is used to calculate a Green's function. For example, wave based approximation techniques, such as finite difference approximation, finite element approximation, and spectrum element approximation can be used to calculate a Green's function.

Figure 3A:
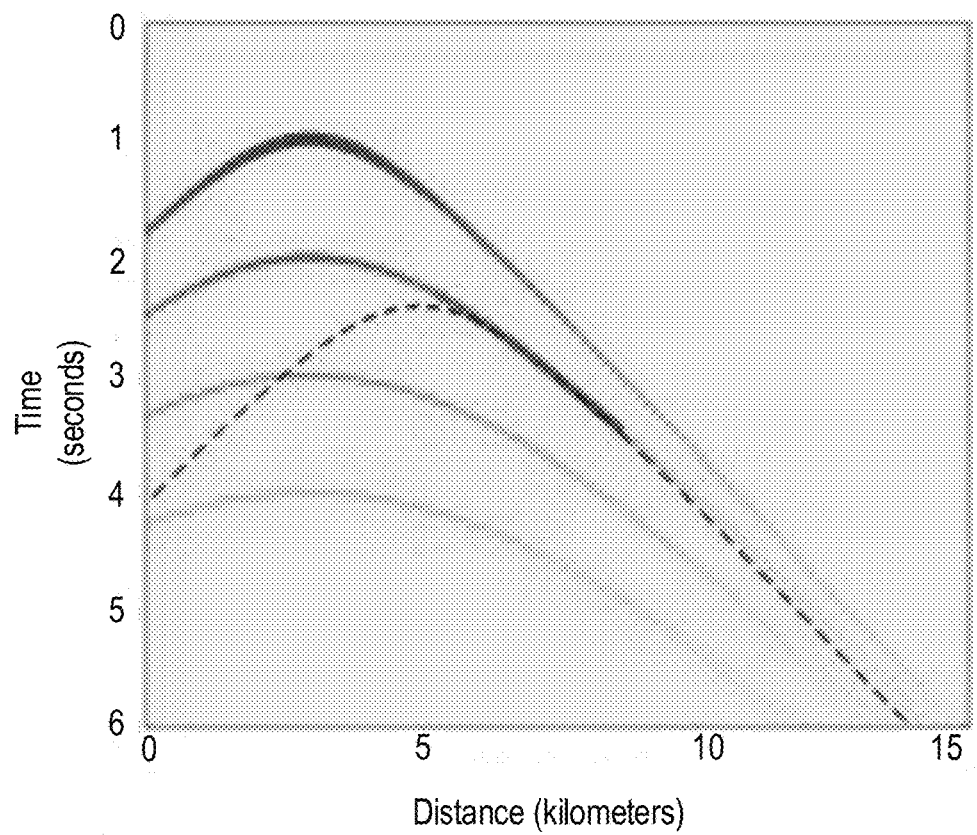
FIG. 3A shows a shot gather from a first seismic data set and a corresponding Green's function for one target point in a target area.

FIG. 3A shows a shot gather from a first seismic data set and a corresponding Green's function for one target point in a target area. The Green's function is represented by the dotted line.

At block 140, the Green's functions are used to map the acquired data to its origin at any target point in the subterranean region. Mapping the acquired data involves integration along the Green's functions (scattering curves) realized by time shifts and summation processes.

Figure 3B:
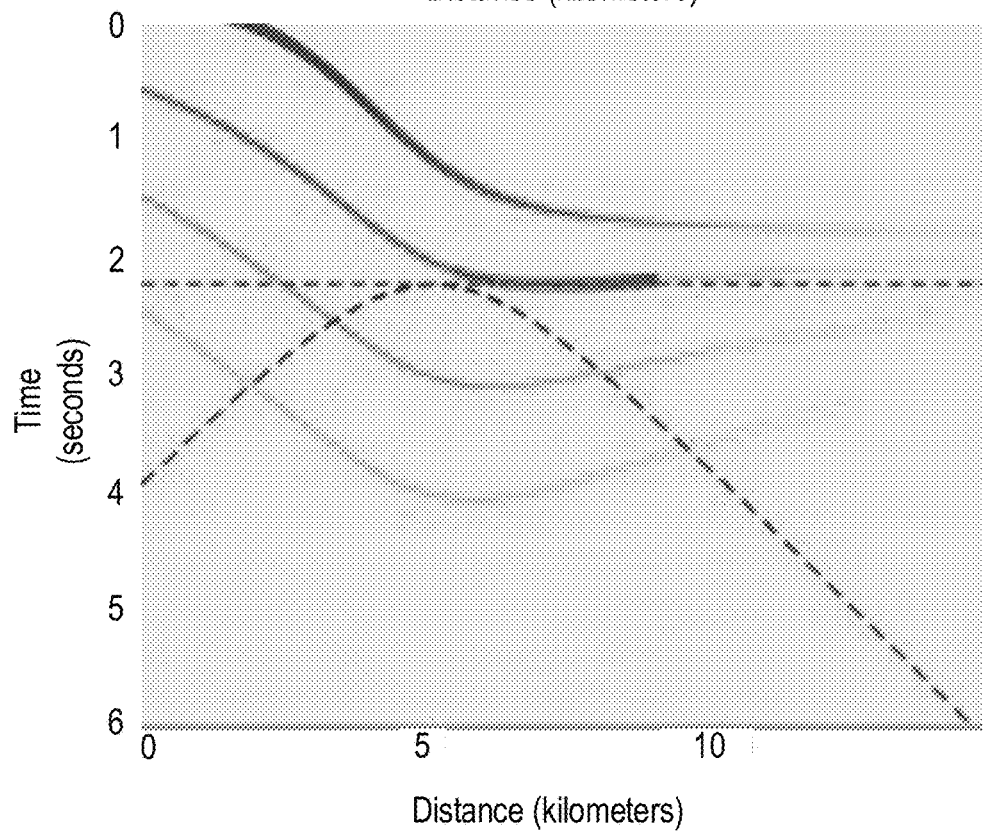
FIG. 3B illustrates the mapping of a shot gather to its origin using the Green's function by time shifts.

FIG. 3B illustrates the mapping of a shot gather to its origin using the Green's function by time shifts.

The integrated Green's functions are used to calculate at least one of amplitude maps (annotating acoustic impedance) or elastic parameters from the first set of raw seismic data. Elastic parameters can include compressional wave velocity, shear wave velocity, and bulk density.

Figure 4:
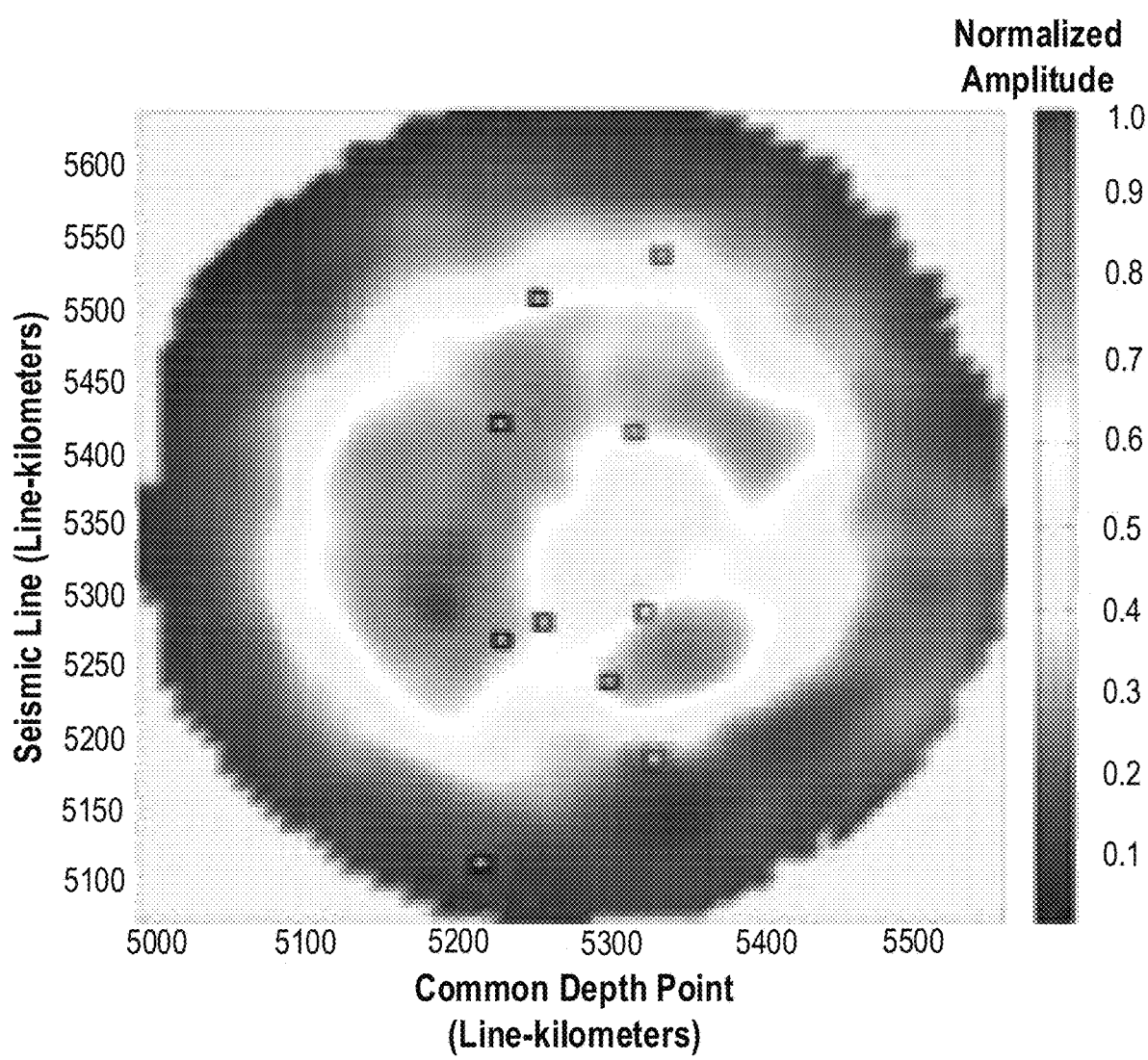
FIG. 4 is an example of an amplitude map of a target region generated for a baseline data set by using Green's functions.

FIG. 4 is an example of an amplitude map of a target region generated for a baseline data set by using Green's functions.

At block 150, a second set of raw seismic data is received. The second set of raw seismic data can be obtained using similar methods as previously described with reference to block 110 and includes data of the same target region as the first set of raw seismic data. The second set of raw seismic data is generated at a time after which the first set of raw seismic data was generated (for example, data generated by a subsequent monitoring survey). The second set of raw seismic data includes less data from the target region than the first set of raw seismic data. For example, in some implementations, the first set of raw seismic data includes data from sources and sensors both near a target reservoir and far away from the target reservoir, which can be important for generating an accurate velocity model, generating an accurate amplitude map, and estimating the elastic properties for the volume of the subterranean region between the target reservoir and surface. However, during hydrocarbon production, most parameters, other than the reservoir fluid levels, typically remain constant and recalculation of these parameters may not be important. However, sources and receivers with special configurations (such as those having offsets larger than 500 meters) around the target reservoirs can be effective in sensing changes in reservoir fluid levels, as changes at the reservoir level due to fluid movement and replacement (such as injected water or $CO_2$) are typically only observed at relatively high reflection angles. Thus, in some implementations, the second set of raw seismic data only includes data associated with these specially configured sources/receivers.

At block 160, the Green's functions derived at block 130 are applied to the second set of raw seismic data to generate a second image of the target region. Similar to the first image, the second image includes an amplitude map with the amplitude map of the second image corresponding to the second set of raw seismic data.

At block 170, the differences of amplitudes between the first image and the second image are calculated to determine the four-dimensional seismic signal.

Figures 5A, 5B:
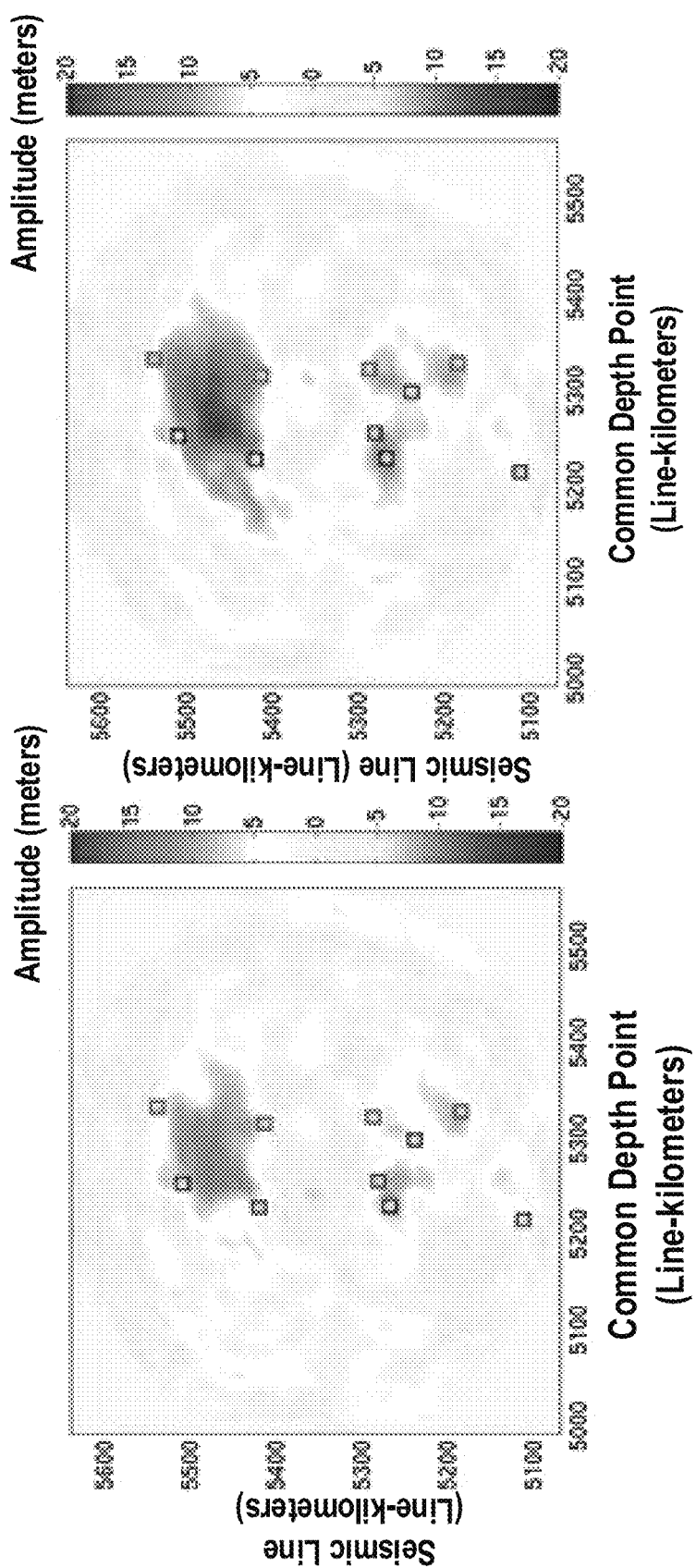
FIG. 5A is a four-dimensional image generated by subtracting the target oriented images between the baseline and monitoring surveys using complete datasets.
FIG. 5B is a four-dimensional image generated by subtracting the target oriented images between the baseline and monitoring surveys using partial datasets with offsets larger than 500 meters.

FIG. 5A is a four-dimensional image generated by subtracting the target oriented images between the baseline and monitoring surveys using complete datasets. FIG. 5B is a four-dimensional image generated by subtracting the target oriented images between the baseline and monitoring surveys using a partial dataset for the monitoring survey image with offsets larger than 500 meters. In comparing the four-dimensional images of FIGS. 5A and 5B, the four-dimensional image generated using the partial monitoring survey dataset is stronger and cleaner (for example, includes less background noise) than the four-dimensional image shown in FIG. 5A.

Figure 6:
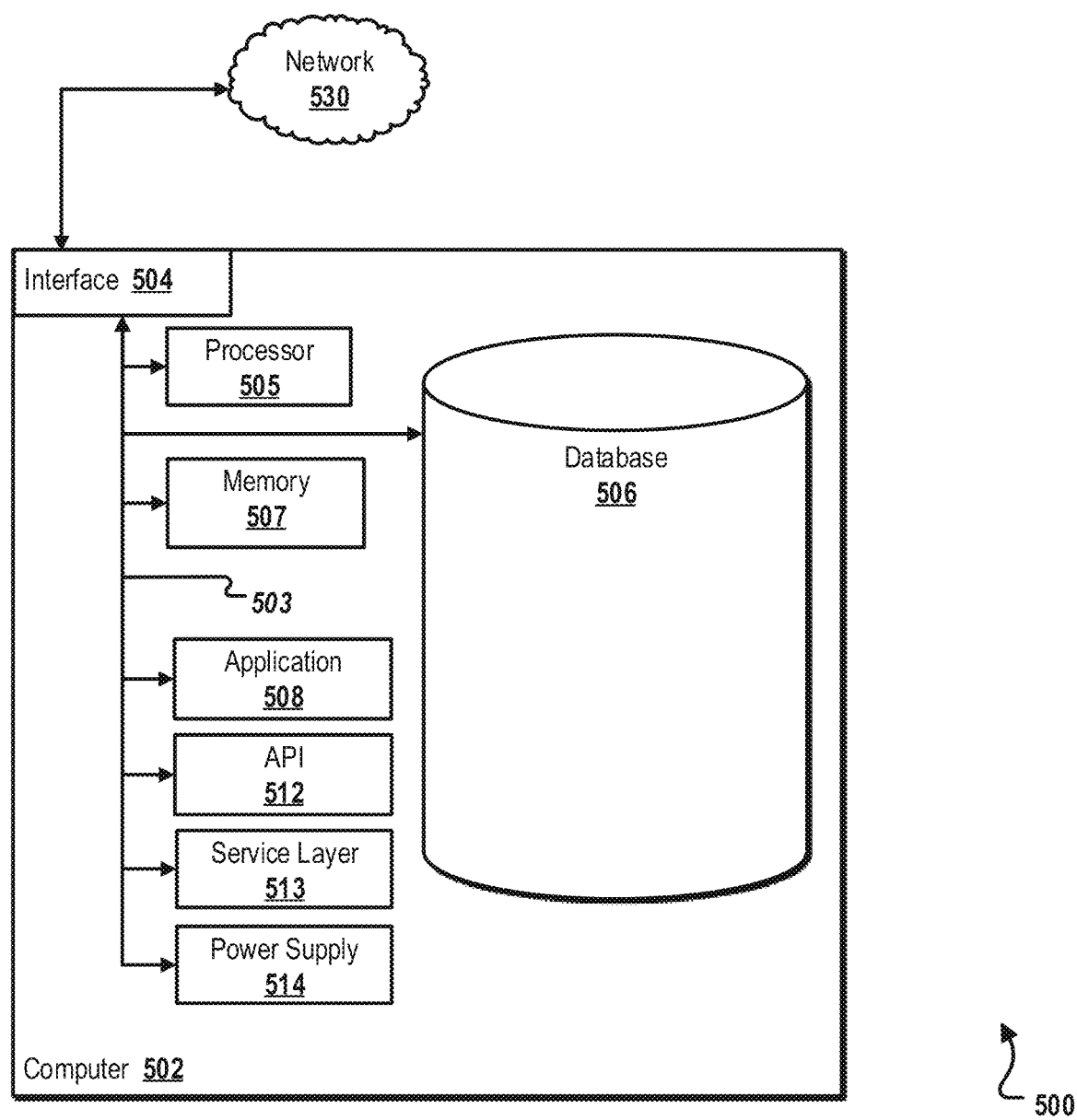
FIG. 6 is a block diagram of an example computer system used to provide computational functionalities associated with the algorithms, methods, functions, processes, flows, and procedures described in the present disclosure.

FIG. 6 is a block diagram of an example computer system 500 used to provide computational functionalities associated with the algorithms, methods, functions, processes, flows, and procedures described in the present disclosure (such as the method 100 described previously with reference to FIG. 1), according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 6, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or can be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 6, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 6, two or more databases (of the same, different, or a combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 6, two or more memories 507 (of the same, different, or a combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including, by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of the exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

What is claimed is:

1. A computer-implemented method of generating a four dimensional seismic signal based on multiple sets of seismic data representing a subterranean formation, the method comprising:

generating a tomographic velocity model that models a portion of the subterranean formation from an acquisition surface to a depth region of the subterranean formation based on a first set of raw seismic data generated at a first time;

determining, using the tomographic velocity model, at least one Green's function at a desired grid spacing from a reservoir level corresponding to the depth region of the subterranean formation to the acquisition surface;

calculating, using the at least one Green's function, a plurality of amplitude maps at the reservoir to allow for reductions in data acquisition and to reduce a computational cost of analyzing subsequent sets of raw seismic data;

generating, based on the first set of raw seismic data, a first image of the reservoir in the subterranean formation;

generating a second set of raw seismic data from information acquired by a plurality of sensors, the second set of raw seismic data being generated at a second time and comprising fewer data items from the reservoir than the first set of raw seismic data generated at the first time;

generating, based on the second set of raw seismic data and at least one of the plurality of amplitude maps, a second image of the reservoir using the at least one Green's function calculated at the desired grid spacing;

comparing the first image with the second image; and based on the comparison, determining a four-dimensional seismic signal that represents a magnitude of change in acoustic response of the reservoir in the subterranean formation over a plurality of different times.

2. The computer-implemented method of claim 1, wherein generating the tomographic velocity model comprises performing full-waveform-inversion.

3. The computer-implemented method of claim 2, wherein generating the tomographic velocity model comprises performing reverse-time-migration.

4. The computer-implemented method of claim 1, wherein determining the at least one Green's function comprises using a ray-tracing eikonal approximation method.

5. The computer-implemented method of claim 1, wherein determining the at least one Green's function comprises using a wave-based approximation method.

6. The computer-implemented method of claim 1, wherein generating the first image and the second image comprises generating a first amplitude map and a second amplitude map.

7. The computer-implemented method of claim 1, wherein the second time occurs after the first time.

8. The computer-implemented method of claim 1, wherein the first set of raw seismic data is received from a first number of sources and the second set of raw seismic data is received from a second number of sources being less than the first number of sources.

9. The computer-implemented method of claim 1, wherein determining a four-dimensional seismic signal comprises determining the difference between a first plurality of amplitudes of the first image and a second plurality of amplitudes of the second image.

10. The computer-implemented method of claim 1, wherein calculating the plurality of amplitude maps at the reservoir using the at least one Green's function comprises:

performing integration along the at least one Green's function based on a plurality of time shifts; and based on the integration, mapping a portion of the first set of raw seismic data to its origin at any target point in the subterranean formation.

11. A system comprising:

a non-transitory computer-readable medium comprising computer-executable instructions; and at least one processor configured to execute the computer-executable instructions to cause performance of operations comprising:

generating a tomographic velocity model that models a portion of the subterranean formation from an acquisition surface to a depth region of the subterranean formation based on a first set of raw seismic data generated at a first time;

determining, using the tomographic velocity model, at least one Green's function at a desired grid spacing from a reservoir level corresponding to the depth region of the subterranean formation to the acquisition surface;

calculating, using the at least one Green's function, a plurality of amplitude maps at the reservoir to allow for reductions in data acquisition and to reduce a computational cost of analyzing subsequent sets of raw seismic data;

generating, based on the first set of raw seismic data, a first image of the reservoir in the subterranean formation;

generating a second set of raw seismic data from information acquired by a plurality of sensors, the second set of raw seismic data being generated at a second time and comprising fewer data items from the reservoir than the first set of raw seismic data generated at the first time;

generating, based on the second set of raw seismic data and at least one of the plurality of amplitude maps, a second image of the reservoir using the at least one Green's function calculated at the desired grid spacing;

comparing the first image with the second image; and based on the comparison, determining a four-dimensional seismic signal that represents a magnitude of change in acoustic response of the reservoir in the subterranean formation over a plurality of different times.

12. The system of claim 11, wherein generating the tomographic velocity model comprises performing full-waveform-inversion.

13. The system of claim 11, wherein generating the tomographic velocity model comprises performing reverse-time-migration.

14. The system of claim 11, wherein determining the at least one Green's function comprises using a ray-tracing eikonal approximation method.

15. The system of claim 11, wherein determining the at least one Green's function comprises using a wave-based approximation method.

16. The system of claim 11, wherein generating the first image and the second image comprises generating a first amplitude map and a second amplitude map.

17. The system of claim 11, wherein the second time occurs after the first time.

18. The system of claim 11, wherein the first set of raw seismic data is received from a first number of sources and the second set of raw seismic data is received from a second number of sources being less than the first number of sources.

19. The system of claim 11, wherein determining a four-dimensional seismic signal comprises determining the difference between a first plurality of amplitudes of the first image and a second plurality of amplitudes of the second image.

20. The system of claim 11, wherein calculating the plurality of amplitude maps at the reservoir using the at least one Green's function comprises:

performing integration along the at least one Green's function based on a plurality of time shifts; and based on the integration, mapping a portion of the first set of raw seismic data to its origin at any target point in the subterranean formation.

* * * * *